US 8,639,234 B2
Jan. 28, 2014

(12) United States Patent
Sumcad et al.

(10) Patent No.: US 8,639,234 B2
(45) Date of Patent: Jan. 28, 2014

(54) SYSTEM AND METHOD FOR PROCESSING VEHICLE COMMUNICATIONS

(75) Inventors: Anthony J. Sumcad, Southfield, MI (US); Navjot Sidhu, Troy, MI (US); Kevin R. Krause, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1628 days.

(21) Appl. No.: 12/059,938

(22) Filed: Mar. 31, 2008

(65) Prior Publication Data

US 2009/0247132 A1    Oct. 1, 2009

(51) Int. Cl.
*H04M 3/00* (2006.01)

(52) U.S. Cl.
USPC ........ 455/419; 455/412.2; 455/418; 455/423; 455/569.1; 455/569.2

(58) Field of Classification Search
None
See application file for complete search history.

(56) References Cited

U.S. PATENT DOCUMENTS

| | | | |
|---|---|---|---|
| 6,944,632 B2 * | 9/2005 | Stern | 1/1 |
| 7,260,383 B1 * | 8/2007 | Ngan | 455/412.1 |
| 8,396,255 B2 * | 3/2013 | Kmiecik et al. | 382/108 |
| 2004/0203974 A1 * | 10/2004 | Seibel | 455/517 |
| 2005/0235048 A1 * | 10/2005 | Costa-Requena et al. | 709/219 |
| 2005/0276416 A1 * | 12/2005 | Zhu et al. | 380/210 |
| 2007/0139182 A1 * | 6/2007 | O'Connor et al. | 340/521 |
| 2007/0155412 A1 * | 7/2007 | Kaltsukis | 455/466 |
| 2009/0002147 A1 * | 1/2009 | Bloebaum et al. | 340/466 |
| 2012/0069975 A1 * | 3/2012 | Odinak et al. | 379/88.14 |
| 2012/0316975 A1 * | 12/2012 | Schorr et al. | 705/16 |

* cited by examiner

*Primary Examiner* — Dai A Phuong
(74) *Attorney, Agent, or Firm* — Anthony Luke Simon; Reising Ethington P.C.

(57) ABSTRACT

A system and a method for improving wireless communications between a call center and a vehicle. The system and method can reduce the number of wireless connections needed between a call center and a vehicle by using multimedia messaging service (MMS) messages to convey information therebetween. This obviates the need for the call center to make an initial wireless connection simply to alert the vehicle that it wishes to communicate. Instead, the system and method can convey information or push down content to the vehicle on a very first connection, which can reduce wireless connections and improve reliability.

20 Claims, 2 Drawing Sheets

SYSTEM AND METHOD FOR PROCESSING VEHICLE COMMUNICATIONS

TECHNICAL FIELD

The present invention generally relates to vehicle communications and, more particularly, to a system and method for processing vehicle communications such as multimedia messaging service (MMS) messages.

BACKGROUND

Communicating wireless information between a vehicle and a remote facility, such as a call center, can sometimes require a number of separate connections. For example, when a call center wishes to send wireless information to a vehicle, it sometimes uses a short messaging service (SMS) message or a circuit-switched connection to make initial contact with the vehicle; this alerts the vehicle that the call center wishes to communicate. After this initial contact, the vehicle calls the call center back by establishing a separate packet-switched connection—a separate connection from the initial connection—so that the wireless information can be exchanged.

There are certain applications that could benefit from a reduction in the number of wireless connections required between a vehicle and a call center. A reduction in the number of connections could result in reduced transmission costs, as well as improved reliability.

SUMMARY OF THE INVENTION

According to one aspect, there is provided a system for processing vehicle communications that comprises a vehicle telematics unit and a vehicle component. In response to the vehicle telematics unit receiving a wireless communication in the form of an MMS message having a payload section, an MMS client: i) processes the MMS message and extracts an MMS message part from the payload section; ii) evaluates the vehicle component and determines its ability to process the extracted MMS message part; and iii) based on the evaluation of the vehicle component, sends the MMS message part to the vehicle component.

According to another aspect, there is provided a system for processing vehicle communications that comprises a call center and a vehicle. Both the call center and the vehicle have an MMS client, wherein: i) the MMS client of either the call center or the vehicle constructs an MMS message; ii) the MMS message is wirelessly sent between the vehicle and the call center over a packet-switched connection; and iii) the MMS client of the other of the call center and the vehicle processes the MMS message.

According to another aspect, there is provided a method for processing vehicle communications. The method comprises the steps of: (a) receiving a wireless communication at a vehicle telematics unit, wherein the wireless communication is in the form of a multimedia messaging service (MMS) message; (b) processing the MMS message with an MMS client maintained at the vehicle telematics unit and extracting an executable script from a payload section of the MMS message; (c) sending the executable script to a vehicle component; and (e) carrying out the executable script at the vehicle component.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The system and method described herein can be used to improve wireless communications between a call center and a vehicle. For example, the system can reduce the number of wireless connections needed between a call center and a vehicle by using MMS messages to convey information therebetween. This obviates the need for the call center to make an initial connection simply to alert the vehicle that it wishes to communicate. Instead, the present system and method can convey information or push down content to the vehicle on the very first connection, which can reduce wireless connections and improve reliability. Furthermore, the present system and method can take advantage of the flexible nature of the MMS payload section (it allows for the transmission of text, image, video, audio files, etc.), as well as other features and attributes inherent to the MMS protocol.

Mobile Vehicle Communications System—

Figure 1:
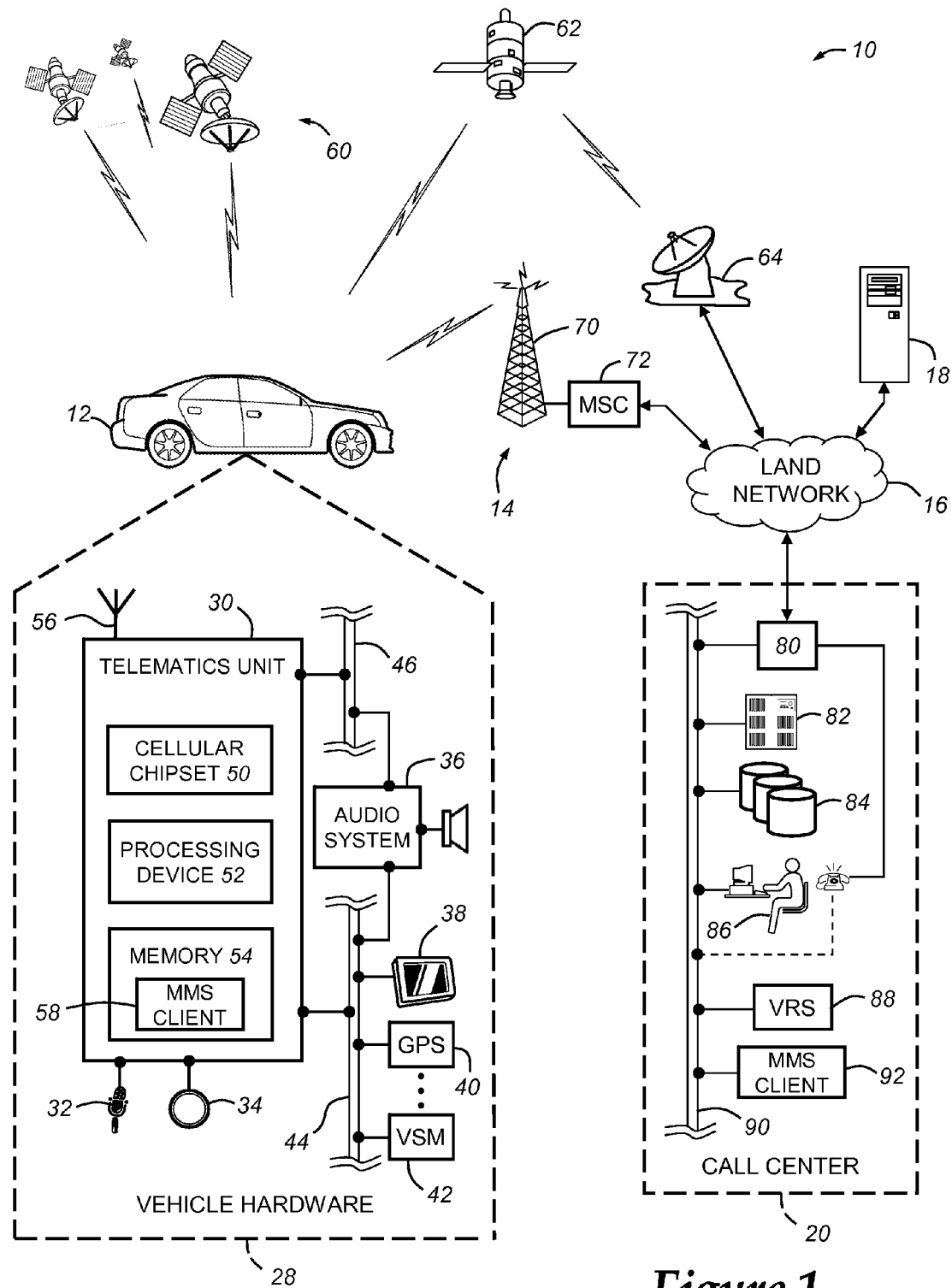
FIG. 1 is an exemplary embodiment of a mobile vehicle communications system.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. The following paragraphs simply provide a brief overview of an exemplary communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and include vehicle components such as vehicle telematics unit 30, a microphone 32, one or more pushbuttons or other control inputs 34, an audio system 36, a visual display 38, and a GPS module 40, as well as a number of vehicle system modules (VSMs) 42. Some of these vehicle components can be connected directly to the vehicle telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Vehicle telematics unit 30 is typically an OEM-installed vehicle component that enables wireless voice and/or data communication over wireless carrier system 14 and via wireless networking so that the vehicle can communicate with call center 20, other telematics-enabled vehicles, or some other entity or device. The vehicle telematics unit preferably uses radio transmissions to establish a communications channel (a voice channel and/or a data channel) with wireless carrier system 14 so that voice and/or data transmissions can be sent and received over the channel. By providing both voice and data communication, vehicle telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, vehicle telematics unit 30 utilizes cellular communication according to either GSM or CDMA standards and thus includes a standard cellular chipset 50 for voice communications like hands-free calling, a wireless modem for data communications, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using vehicle telematics unit 30. For this purpose, vehicle telematics unit 30 can be configured to communicate wirelessly according to one or more wireless protocols, such as any of the IEEE 802.11 protocols, WiMAX, or Bluetooth. When used for packet-switched data communication such as TCP/IP, the vehicle telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for vehicle telematics unit 30 or can be shared with other vehicle components and systems. Processor 52 executes various types of digitally-stored instructions, such as software or firmware programs stored in memory 54, which enable the vehicle telematics unit to provide a wide variety of services. For instance, processor 52 can execute programs or process data to carry out the method discussed herein, including programs associated with an MMS client.

MMS client 58 is a collection of one or more software programs, scripts, modules, etc. that is designed to send, receive, and otherwise process MMS messages. According to an exemplary embodiment, MMS client 58 is maintained in vehicle telematics unit 30 and includes an authentication manager, a parser, a distribution manager, as well as any other suitable pieces of software known to those skilled in the art. This is only one exemplary embodiment, however, as MMS client 58 can include other pieces of software in lieu of or in addition to those mentioned here (e.g., MMS client 58 could include a wireless application protocol (WAP) manager, browser, etc.). MMS client 58 can be a standalone software entity, or it can be integrated into a larger software program, collection of programs, system, etc. It should be appreciated that while FIG. 1 schematically depicts MMS client 58 residing in memory 54 of the vehicle telematics unit, the MMS client could instead reside in one of a number of different locations around the vehicle; this includes locations internal and external to vehicle telematics unit 30. In the example where MMS client 58 is maintained within telematics unit 30, the MMS client can utilize processing device 52 to carry out executable instructions. Other processing arrangements could also be implemented, however, including arrangements where MMS client 58 relies upon processing devices other than device 52.

Vehicle telematics unit 30 can be used to provide a diverse range of vehicle services that involve wireless communication to and/or from the vehicle. Such services include: diagnostic reporting using one or more diagnostic modules or VSMs 42; software updating or vehicle component configuring; turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); and infotainment-related services where music, webpages, movies, television programs, videogames and/or other information is downloaded by an infotainment module (not shown) and is stored for current or later playback. The above-listed services are by no means an exhaustive list of all of the capabilities of vehicle telematics unit 30, but are simply an enumeration of some of the services that the vehicle telematics unit is capable of offering. Furthermore, it should be understood that at least some of the aforementioned modules could be implemented in the form of software instructions saved internal or external to vehicle telematics unit 30, they could be hardware components located internal or external to vehicle telematics unit 30, or they could be integrated and/or shared with each other or with other systems located throughout the vehicle, to cite but a few possibilities. In the event that the modules are implemented as VSMs 42 located external to vehicle telematics unit 30, they could utilize communications bus 44 to exchange data and commands with the vehicle telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via vehicle telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the vehicle telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to vehicle telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the ECM is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the vehicle components that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to vehicle telematics unit 30 to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into vehicle telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both communications bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via vehicle telematics unit 30 and wireless carrier 14. Other such accessible computers 18 can be, for example: a service center computer where diagnostic information and other vehicle data can be uploaded from the vehicle via vehicle telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle with a number of different system back-end functions and, according to the exemplary embodiment shown here, generally includes one or more switches 80, servers 82, databases 84, live advisors 86, an automated voice response system (VRS) 88, and an MMS client 92. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. MMS client 92 is schematically shown as a standalone entity in call center 20, however, it should be appreciated that the MMS client could be integrated into one or more of the other call center components and systems. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Processing Method—

Figure 2:
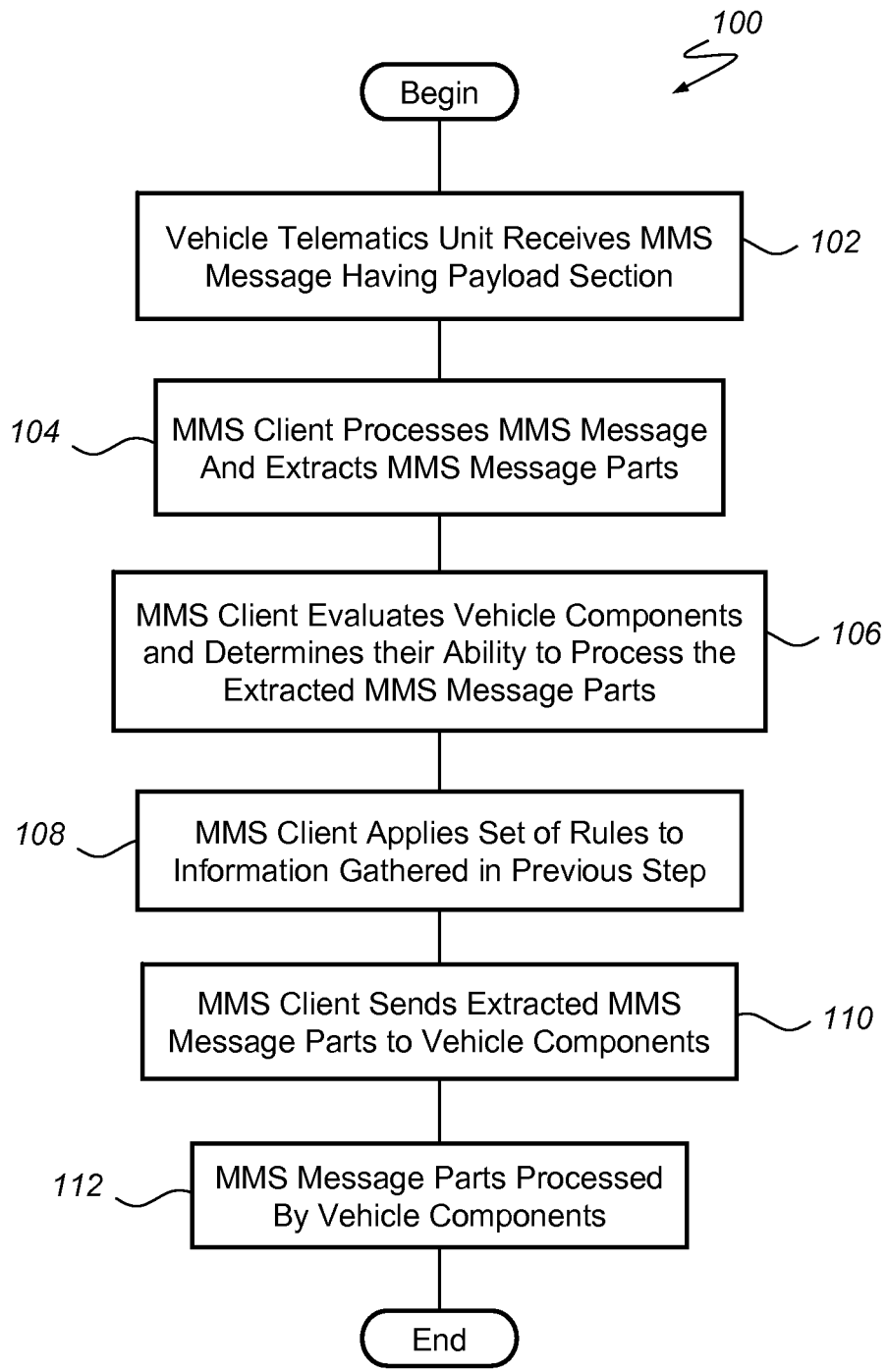
FIG. 2 is a flowchart showing some of the steps of an exemplary method for processing vehicle communications.

Turning now to FIG. 2, there is shown a flowchart that illustrates an exemplary embodiment of a method 100 for processing vehicle communications. As previously mentioned, the present system and method can be used to improve wireless communications between a vehicle and a call center or other remote entity.

Although the examples described below are directed to MMS messages, it should be appreciated that a variety of integrated multi-part messages, not just MMS messages, could also be used. The term "integrated multi-part message" broadly includes all electronic messages having a messaging protocol that allows for a plurality of distinct parts or objects (e.g., text, images, video, audio, etc.) to be embedded or integrated within a single message. Examples of integrated multi-part messages include MMS messages and enhanced messaging service (EMS) messages, to name but a few. As people skilled in the art will appreciate, an integrated multi-part message is a single entity and is different than a message having a collection of non-integrated objects, such as an email with attachments.

The following examples are generally directed embodiments where wireless communications are received at a vehicle. It should be appreciated, however, that the present system and method could also be used with embodiments where wireless communications are sent from a vehicle instead.

Beginning with step 102, vehicle telematics unit 30 receives a wireless communication in the form of an MMS message having a payload section. As persons skilled in the art understand, MMS messages are typically sent over a packet-switched connection and generally conform to an MMS protocol. Information on various aspects of the MMS protocol can be found in the following documents: WAP-206-MMSCTR-20020115-a (MMS Client Transaction Specification) and WAP-209-MMSEncapsulation-20020105-a (MMS Encapsulation Specification). Unlike SMS messages, which are limited to a certain size and can typically only include text information, MMS messages generally have no size limit and can convey a variety of different file types including text, image, video, and audio files. Similar to SMS messages, MMS messages usually sent on a store-and-forward principal.

Next, MMS client 58 processes the MMS message and extracts one or more MMS message parts from the payload section, step 104. As previously explained, MMS client 58 can include an authentication manager, a parser, a distribution manager, as well as other suitable pieces of software known in the art. The authentication manager authenticates an incoming MMS message by employing various techniques to identify the sender. The parser can parse the payload section into one or more smaller MMS message parts, and can then extract or remove these parts for individual processing. Some examples of parsed MMS message parts include objects in the form of text, image, video, audio, etc. The distribution manager evaluates the parsed MMS message parts and, after applying a set of rules, distributes the MMS message parts to one or more vehicle components. Some exemplary aspects of MMS client 58, which in some aspects acts like a rendering engine, are now provided.

The authentication manager is a component of the MMS client 58 and preferably performs authentication and other security-related functions. For example, an MMS message could be received by vehicle telematics unit 30 that includes two MMS message parts: a text-based command for remotely starting the vehicle, and an image-based picture of the vehicle owner. It is possible to embed the text-based command within the image-based picture so that it is hidden from unauthorized third parties. Stated differently, the executable script that comprises the remote start command can be covertly integrated into the picture so that if intercepted, a third party would be unable to identify the remote start command. Instead, the third party would simply see the picture. On the vehicle side, the authentication manager can use the image-based picture to authenticate the identity of the sender; i.e., use the picture as an authentication key. This authentication feature is facilitated by the flexibility of the MMS protocol; namely, the ability of an MMS payload section to carry different types of message parts (e.g., text, image, video, audio). Although the preceding example is directed to an embodiment where a text-based object is embedded within an image-based object, it should be appreciated that any combination of text, image, video, audio combinations are possible. Furthermore, multiple objects could be embedded into a single object (e.g., multiple text-based commands embedded within a single image, video, or audio file). The authentication manager can use any combination of authentication, decryption, and other security-related techniques known in the art to authenticate the MMS message.

In step 106, MMS client 58 evaluates one or more vehicle components and determines their ability to process the extracted MMS message parts. According to an exemplary embodiment, the distribution manager of the MMS client evaluates different vehicle components, including one or more of the following: audio system 36, visual display 38, global positioning system (GPS) module 40, and the various vehicle system modules (VSMs) 42. There are a number of ways in which vehicle components can be evaluated, including the use of a master list or summary maintained at the vehicle, the use of a master list maintained at call center 20, and the interrogation of the various vehicle components.

If a master list maintained at the vehicle is used, the distribution manager can simply consult its contents in order to determine the status and nature of all the available vehicle components. With this information, the distribution manager can distribute or send the extracted MMS message parts to the appropriate destination. If a master list is maintained at a remote facility, like call center 20, computer 18, etc., then a wireless vehicle-originated call would need to be made so that the contents of the master list could be retrieved. In the interrogation example, the distribution manager can query or otherwise request information from the different vehicle components via communications bus 44. Once all of the relevant vehicle components have been evaluated, the information gleaned from that evaluation can be applied to a set of rules to determine how to best distribute the MMS message parts extracted from the payload section.

In step 108, MMS client 58 applies a set of rules to the information gathered in the previous step. In an exemplary embodiment, the distribution manager of the MMS client applies the set of rules in order to determine where, when, and/or how to distribute the extracted MMS message parts within the vehicle. These rules are similar to those utilized by expert or other knowledge-based systems. Consider the example where an MMS message includes a first MMS message part that is a text-based command (e.g., to perform an engine diagnostic check), and a second MMS message part that is an image-based message (e.g., to inform the driver of the engine diagnostic check). Application of the rules in step 108 could determine that the first MMS message (text-based command to perform engine diagnostic check) part should: i) be sent to an engine control module (ECM) capable of carrying out the executable script in the text-based command, ii) only be carried out when the vehicle is running, and iii) not be modified, as the text-based command includes an executable script that already conforms to the protocol used by the ECM.

A different set of rules could be applied to the second MMS message part—i.e., the image-based driver message—to determine where, when, and/or how it should be sent. Application of the set of rules could determine that the second MMS message part should: i) be sent to visual display 38, which is capable of conveying the message to the driver, ii) only be displayed to the driver the vehicle is traveling less than a predetermined speed, for instance 5 m.ph., and iii) be modified to remove any formatting not supported by visual display 38. These are, of course, only two examples of MMS message parts that can be extracted, processed, and applied to a set of rules. MMS message parts other than engine diagnostic routines and driver messages could be used by the system and method described herein. It is possible for step 108 to result in multiple destinations for a single MMS message part; e.g., a single diagnostic check being sent to multiple vehicle system modules (VSMs) 42.

Next, MMS client 58 sends the extracted MMS message part to one or more vehicle components, step 110. This can be performed in a variety of ways. Depending on the embodiment, an extracted MMS message part can be sent to a single vehicle component or to multiple vehicle components over communications bus 44. Other communication methods and techniques known in the art could be used to transfer MMS message parts, whether they be executable scripts or other types of message parts, to vehicle components.

The MMS message parts are then processed by the appropriate vehicle components, step 112. If the MMS message part is a text-based executable script, then the instructions of the script are executed or otherwise carried out by the VSM 42 or other vehicle component to which it was sent. If, on the other hand, the MMS message part is an image or a video, then it is sent to visual display 38 or some other display component for presentation to the vehicle occupants. If the MMS message part is an audio file, then it can be provided to audio system 36 for processing and audible presentation through the vehicle's speakers, etc. The particular ways in which vehicle components can process electronic files, such as executable scripts (used for non-display purposes) and images, video, audio, etc. (used for display purposes), is generally known in the art and is not reiterated here.

In some embodiments, a responsive communication from the vehicle component is required. For example, in the engine diagnostic routine mentioned above, the ECM can send a diagnostic output to vehicle telematics unit 30 or some other vehicle component via communications bus 44; this is an example of an intra-vehicle response. In other cases, an inter-vehicle response may be needed where vehicle telematics unit 30 sends a wireless communication back to call center 20 or some other entity. Turning again to the engine diagnostic routine example, if the executable script instructs the ECM to gather information, that information may be desired back at call center 20 or some other remote facility for further testing, analyzing, etc. In such a case, an inter-vehicle response from telematics unit 30 to call center 20 could be sent as an MMS message or as some other message type.

Some examples of text-based commands that could be sent to the vehicle in a payload section of an MMS message include, but are certainly not limited to, those related to: diagnostics, data collection, device or component configuration, door lock/unlock procedures, remote ignition start procedures, turn-by-turn navigation, etc. Some examples of image-, video-, and audio-based message parts that could be included within an MMS message payload section and used with the system and method described herein include those related to: visual and audible messages for vehicle occupants, turn-by-turn navigation, entertainment purposes, etc.

The system and method described above can also be successfully used in bulk messaging or broadcast applications. As previously explained, the present system and method can reduce the number of wireless connections required for the vehicle communications. This can be particularly advantageous when the call center or other remote facility constructs or otherwise creates an MMS message to send out to numerous telematics-equipped vehicles. Of course, wireless messages could also be sent from and received by other wireless-enabled devices, such as computers, mobile phones, personal digital assistants, etc.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for processing vehicle communications, comprising:
   a vehicle telematics unit that sends and receives wireless communications and includes a multimedia messaging service (MMS) client located on a vehicle; and
   a vehicle component that is coupled to the vehicle telematics unit, wherein, in response to the vehicle telematics unit receiving a wireless communication in the form of an MMS message having a payload section, the MMS client:
  i) processes the MMS message and extracts a first MMS message part and a second MMS message part from the payload section;
  ii) evaluates the vehicle component and determines its ability to process the first MMS message part or the second MMS message part;
  iii) applies a first set of rules to the first MMS message part and a second set of rules to the second MMS message part; and
  iv) sends the first MMS message part to the vehicle component based on the first set of rules and the second MMS message part to a second vehicle component based on the second set of rules.

2. The system of claim 1, wherein the MMS client includes an authentication manager that authenticates the MMS message, a parser that parses the payload section into one or more MMS message parts, and a distribution manager that distributes the MMS message parts.

3. The system of claim 2, wherein the MMS message includes the first MMS message part embedded within the second MMS message part, and the authentication manager uses the second MMS message part as an authentication key.

4. The system of claim 3, wherein the first MMS message part is a text file and the second MMS message part is either an image file, a video file, or an audio file.

5. The system of claim 2, wherein the distribution manager evaluates the vehicle component by requesting information from the vehicle component via a communications bus.

6. The system of claim 2, wherein the distribution manager determines the ability of the vehicle component to process the extracted first or second MMS message part by applying a set of rules maintained at the vehicle telematics unit.

7. The system of claim 1, wherein the vehicle component is a vehicle system module (VSM) that is coupled to the vehicle telematics unit via a communications bus.

8. The system of claim 1, wherein the extracted first or second MMS message part is a text-based command to perform a diagnostic check with one or more vehicle system modules (VSMs).

9. The system of claim 1, wherein the extracted first or second MMS message part is an image-based message to convey a message to a vehicle occupant via a visual display.

10. The system of claim 1, wherein the extracted first or second MMS message part is an audio-based message to convey a message to a vehicle occupant via an audio system.

11. A system for processing vehicle communications, comprising:
  a call center that sends and receives wireless communications and includes a multimedia messaging service (MMS) client; and
  a vehicle that sends and receives wireless communications and includes an MMS client, wherein:
    i) the MMS client of either the call center or the vehicle constructs an MMS message, including one or more message parts at least one of which is a text-based command, and includes the one or more message parts in a payload section of the MMS message;
    ii) the MMS message is wirelessly sent between the vehicle and the call center over a packet-switched connection; and
    iii) the MMS client of the other of the call center and the vehicle parses the MMS message into the one or more MMS message parts, wherein at least one MMS message part of the MMS message received at the vehicle is a text-based command to perform a diagnostic check with one or more vehicle system modules (VSMs).

12. The system of claim 11, wherein the MMS client of the vehicle includes an authentication manager that authenticates the MMS message, a parser that parses the payload section into one or more MMS message parts, and a distribution manager that distributes the MMS message parts.

13. The system of claim 12, wherein the MMS message includes a first MMS message part embedded within a second MMS message part, and the authentication manager uses the second MMS message part as an authentication key.

14. The system of claim 13, wherein the first MMS message part is a text file and the second MMS message part is either an image file, a video file, or an audio file.

15. The system of claim 12, wherein the distribution manager evaluates a vehicle component and determines its ability to process the removed MMS message part and, based on the evaluation of the vehicle component, sends the removed MMS message part to the vehicle component.

16. The system of claim 15, wherein the distribution manager determines the ability of the vehicle component to process the removed MMS message part by applying a set of rules maintained at the vehicle telematics unit.

17. The system of claim 11, wherein the removed MMS message part is an image-based message to convey a message to a vehicle occupant via a visual display.

18. The system of claim 11, wherein the removed MMS message part is an audio-based message to convey a message to a vehicle occupant via an audio system.

19. The system of claim 11, wherein the MMS client of the call center constructs an MMS message and wirelessly sends the MMS message to a plurality of vehicles.

20. A method for processing vehicle communications, comprising the steps of:
  (a) receiving a wireless communication at a vehicle telematics unit, wherein the wireless communication is in the form of a multimedia messaging service (MMS) message having one or more message parts in a payload section that includes an executable script that directs the vehicle telematics unit to perform a diagnostic check with one or more vehicle system modules (VSMs);
  (b) processing the MMS message with an MMS client maintained at the vehicle telematics unit by authenticating the MMS message and extracting the executable script from the payload section of the MMS message;
  (c) sending the executable script to a vehicle component; and
  (d) carrying out the executable script at the vehicle component.

* * * * *